US011431572B2

(12) United States Patent
Suwi et al.

(10) Patent No.: US 11,431,572 B2
(45) Date of Patent: Aug. 30, 2022

(54) SEMANTIC DETECTION AND RESOLUTION OF CONFLICTS AND REDUNDANCIES IN NETWORK FUNCTION VIRTUALIZATION POLICIES

(71) Applicants: Hanan Suwi, Montreal (CA); Nadjia Kara, Kirkland (CA); Claes Göran Robert Edström, Beaconsfield (CA)

(72) Inventors: Hanan Suwi, Montreal (CA); Nadjia Kara, Kirkland (CA); Claes Göran Robert Edström, Beaconsfield (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/439,103

(22) PCT Filed: Mar. 14, 2019

(86) PCT No.: PCT/IB2019/052100
§ 371 (c)(1),
(2) Date: Sep. 14, 2021

(87) PCT Pub. No.: WO2020/183228
PCT Pub. Date: Sep. 17, 2020

(65) Prior Publication Data
US 2022/0150122 A1 May 12, 2022

(51) Int. Cl.
*G06F 15/173* (2006.01)
*H04L 41/0893* (2022.01)
(Continued)

(52) U.S. Cl.
CPC ...... *H04L 41/0893* (2013.01); *H04L 41/0873* (2013.01); *H04L 41/5054* (2013.01)

(58) Field of Classification Search
CPC ............. H04L 41/0893; H04L 41/0873; H04L 41/5054
See application file for complete search history.

(56) References Cited

U.S. PATENT DOCUMENTS 9,462,427 B2  10/2016 Patel et al.
9,674,343 B2  6/2017 Foladare et al.
(Continued)

FOREIGN PATENT DOCUMENTS

EP  3121997 A1  5/2021

OTHER PUBLICATIONS

Espling, Daniel et al., "Modeling and Placement of Cloud Services with Internal Structure", IEEE Transactions on Cloud Computing, vol. 4, No. 4, Oct.-Dec. 2016.
(Continued)

*Primary Examiner* — Wing F Chan
*Assistant Examiner* — Joseph R Maniwang
(74) *Attorney, Agent, or Firm* — Julie Dufort; Ericsson Canada Inc.

(57) ABSTRACT

Network policies for providing a network service are managed in a Network Function Virtualization (NFV) environment. The policies are obtained from service requests and specify placement and lifecycle management of Virtual Network Functions (VNFs). Attribute values are extracted from each policy. The extracted attribute values include at least a policy type value which specifies an action performed by the policy. The policies are grouped based on the attribute values. The policies in the same group share at least a common policy type value. The attribute values are compared within each group to detect conflicts and redundancies before deployment of the network service and in real-time after the network service is deployed. One or more of the obtained policies are removed to produce a policy repository free of the conflicts and the redundancies.

22 Claims, 18 Drawing Sheets

(51) Int. Cl.
  *H04L 41/0873* (2022.01)
  *H04L 41/5054* (2022.01)

(56) References Cited

U.S. PATENT DOCUMENTS

| | | | |
|---|---|---|---|
| 9,794,370 | B2 | 10/2017 | Abbasi et al. |
| 9,864,640 | B2 | 1/2018 | Kofkin-Hansen et al. |
| 9,871,823 | B2 | 1/2018 | Sood et al. |
| 9,875,144 | B2 | 1/2018 | Kofkin-Hansen et al. |
| 9,886,176 | B2 | 2/2018 | Cropper |
| 9,894,165 | B2 | 2/2018 | Yazir et al. |
| 9,930,587 | B2 | 3/2018 | Vrzic et al. |
| 9,967,136 | B2 | 5/2018 | Krishnan et al. |
| 2014/0086177 | A1 | 3/2014 | Adjakple |
| 2015/0381423 | A1 | 12/2015 | Xiang |
| 2016/0328259 | A1 | 11/2016 | Xia et al. |
| 2017/0026235 | A1 | 1/2017 | Famaey |
| 2017/0046205 | A1 | 2/2017 | Kofkin-Hansen et al. |
| 2017/0046206 | A1 | 2/2017 | Kofkin-Hansen et al. |
| 2017/0048165 | A1 | 2/2017 | Yu et al. |
| 2017/0310611 | A1 | 10/2017 | Kumar et al. |
| 2017/0371717 | A1 | 12/2017 | Kiess et al. |
| 2018/0046477 | A1 | 2/2018 | Aelken et al. |
| 2018/0115470 | A1 | 4/2018 | Huang et al. |
| 2018/0260745 | A1 | 9/2018 | Jana et al. |
| 2018/0288622 | A1 | 10/2018 | Maria |
| 2018/0295067 | A1 | 10/2018 | Xia et al. |
| 2018/0307539 | A1 | 10/2018 | Celozzi et al. |
| 2018/0314549 | A1 | 11/2018 | Chokkalingam et al. |
| 2018/0324261 | A1 | 11/2018 | Yi et al. |
| 2019/0068619 | A1 | 2/2019 | Fan |

OTHER PUBLICATIONS

ETSI, "Network Functions Virtualisation (NFV) Release 3; Reliability; Maintaining Service Availability and Continuity Upon Software Modification", GS NFV-REL 006 V3.1.1 (Feb. 2018).

ETSI, "Network Functions Virtualisation (NFV); Management and Orchestration; Report on Policy Management in MANO Release 3", GR NFV-IFA 023 V3.1.1. Jul. 2017.

N. Bouten et al., "Semantically Enhanced Mapping Algorithm for Affinity-Constrained Service Function Chain Requests", Citation information: DOI 10.1109/TNSM.2017.2681025, IEEE—Transactions on Network and Service Management, 2016 IEEE.

```
<PolicySet>
    <Policy Id="P1" type="Affinity" globalPriority="Critical" localPriority="Medium">
        <PolicyType>Placement</PolicyType>
        <Tragets>
            <functionNodeA>VNF_1</functionNodeA>
            <location>PM_A</location>
        </Tragets>
    </Policy>
    <Policy Id="P2" type="Affinity" globalPriority="Critical" localPriority="High">
        <PolicyType>Horizontal-Scaling</PolicyType>
        <Tragets>
            <functionNodeA>VNF_3</functionNodeA>
        </Tragets>
        <Conditions>
            <conditionA>min_num_ofInstances: 4</conditionA>
            <conditionB>max_num_ofInstances: 16</conditionB>
        </Conditions>
    </Policy>
    <Policy Id="P3" type="Anti-Affinity" globalPriority="High" localPriority="Critical">
        <PolicyType>Vertical-Scaling</PolicyType>
        <Tragets>
            <functionNodeA>VNF_5</functionNodeA>
        </Tragets>
    </Policy>
    <Policy Id="P4" type="Affinity" globalPriority="High" localPriority="High">
        <PolicyType>Placement</PolicyType>
        <Tragets>
            <functionTypeA>VNF_A</functionTypeA>
            <functionTypeB>VNF_B</functionTypeB>
            <locationType>AC</locationType>
        </Tragets>
    </Policy>
    <Policy Id="P5" type="Anti-Affinity" globalPriority="Critical" localPriority="Low">
        <PolicyType>Placement</PolicyType>
        <Tragets>
            <connectionC>e1</connectionC>
            <connectionD>e2</connectionB>
            <locationType>DC</locationType>
        </Tragets>
    </Policy>
</PolicySet>
```

FIG. 8

```
xs:element name="Policy" maxOccurs="unbounded" minOccurs="0">
<xs:complexType>
  <xs:sequence>
  <xs:element name="PolicyType"/>
  <xs:element name="Targets">
    <xs:complexType>
    <xs:choice>
      <xs:sequence>
      <xs:choice>
       <xs:element name="locationType" type="LocationType"/>
       <xs:element name="location" type="Location"/>
      </xs:choice>
      <xs:choice>
       <xs:element name="functionTypeA" type="FunctionType"/>
       <xs:element name="functionNodeA" type="NetworkFunction"/>
      </xs:choice>
      <xs:choice minOccurs="0">
       <xs:element name="functionTypeB" type="FunctionType"/>
       <xs:element name="functionNodeB" type="NetworkFunction"/>
      </xs:choice>
      </xs:sequence>
      <xs:sequence>
       <xs:element name="connectionC" type="virtualLink"/>
       <xs:choice>
        <xs:element name="connectionD" type="virtualLink"/>
        <xs:choice>
         <xs:element name="locationType" type="LocationType"/>
         <xs:element name="location" type="Location"/>
        </xs:choice>
       </xs:choice>
      </xs:sequence>
    </xs:choice>
    </xs:complexType>
  </xs:element>
  </xs:sequence>
<xs:attribute name="Id" type="xs:string"/>
<xs:attribute name="type" type="ConstraintType"/>
<xs:attribute name="globalPriority" type="xs:string"/>
<xs:attribute name="localPriority" type="xs:string"/>
</xs:complexType>
/xs:element>
```

FIG. 9

```
<xs:element name="Policy" maxOccurs="unbounded" minOccurs="0">
 <xs:complexType>
  <xs:sequence>
   <xs:element name="PolicyType"/>
   <xs:element name="Targets">
    <xs:complexType>
     <xs:sequence>
      <xs:choice>
       <xs:element name="functionTypeA" type="FunctionType"/>
       <xs:element name="functionNodeA" type="NetworkFunction" /:
      </xs:choice>
      <xs:choice minOccurs="0">
       <xs:element name="functionTypeB" type="FunctionType"/>
       <xs:element name="functionNodeB" type="NetworkFunction"/>
      </xs:choice>
     </xs:sequence>
    </xs:complexType>
   </xs:element>
   <xs:element name="Conditions">
    <xs:complexType>
     <xs:sequence>
      <xs:choice>
       <xs:element name="conditionA" type="xs:string"/>
       <xs:element name="conditionB" type="xs:string"/>
      </xs:choice>
     </xs:sequence>
    </xs:complexType>
   </xs:element>
  </xs:sequence>
  <xs:attribute name="Id" type="xs:string"/>
  <xs:attribute name="type" type="ConstraintType"/>
  <xs:attribute name="globalPriority" type="xs:string"/>
  <xs:attribute name="localPriority" type="xs:string"/>
 </xs:complexType>
</xs:element>
```

FIG. 10

Example of conflicted of placement constraints CASE #1

```xml
<Policy Id="P1" type="Affinity" globalPriority="Critical" localPriority="High" >
  <PolicyType>Placement</PolicyType>
  <Targets>
    <functionNodeA>VNF_1</functionNodeA>
    <functionNodeB>VNF_2</functionNodeB>
    <locationType>DC</locationType>
  </Targets>
</Policy>

<Policy Id="P2" type="Anti-Affinity" globalPriority="High" localPriority="High" >
  <PolicyType>Placement</PolicyType>
  <Targets>
    <functionNodeA>VNF_1</functionNodeA>
    <functionNodeB>VNF_2</functionNodeB>
    <locationType>DC</locationType>
  </Targets>
</Policy>
```

Example of conflicted of placement constraints CASE #2

```xml
<Policy Id="P3" type="Affinity" globalPriority="High" localPriority="Medium">
  <PolicyType>Placement</PolicyType>
  <Targets>
    <functionNodeA>VNF_1</functionNodeA>
    <functionNodeB>VNF_2</functionNodeB>
    <locationType>AS</locationType>
  </Targets>
</Policy>

<Policy Id="P4" type="Affinity" globalPriority="High" localPriority="High">
  <PolicyType>Placement</PolicyType>
  <Targets>
    <functionNodeA>VNF_1</functionNodeA>
    <location>AS1</location>
  </Targets>
</Policy>

<Policy Id="P5" type="Affinity" globalPriority="Medium" localPriority="Critical">
  <PolicyType>Placement</PolicyType>
  <Targets>
    <functionNodeA>VNF_2</functionNodeA>
    <location>AS3</location>
  </Targets>
</Policy>
```

FIG. 11

Example of conflicted of horizontal-scaling constraints CASE #3

```xml
<Policy Id="P6" type="Affinity" globalPriority="High"  localPriority="Medium">
  <PolicyType>Horizontal-Scaling</PolicyType>
  <Targets>
    <functionNodeA>VNF_3</functionNodeA>
  </Targets>
  <Conditions>
    <conditionA>CPU_utilization greater_than 80%
        </condlitionA>
  </Conditions>
</Policy>

<Policy Id="P7" type="Affinity" globalPriority="High"  localPriority="Low">
  < PolicyType >Horizontal-Scaling</ PolicyType >
  <Targets>
    <functionNodeA>VNF_3</functionNodeA>
  </Targets>
  <Conditions>
    <conditionA>CPU_utilization greater_than 60%
        </condlitionA>
  </Conditions>
</Policy>
```

Example of Redundant constraints CASE #4

```xml
<Policy Id="P8" type="Affinity" globalPriority="Critical" localPriority="Medium">
  <PolicyType>Placement</PolicyType>
  <Targets>
    <functionTypeA>Firewall</functionTypeA >
    <location>AS1</location>
  </Targets>
</Policy>

<Policy Id="P9" type="Affinity" globalPriority="High"  localPriority="Medium">
  <PolicyType>Placement</PolicyType>
  <Targets>
    <functionTypeA>Firewall</functionTypeA >
    <location>AS1</location>
  </Targets>
</Policy>
```

FIG. 12

Algorithm 1: Offline Policy Checker Algorithm

1: Input: XML file $f$ containing the policies $p$.
2: Output: Analysis report containing conflicting and redundant sets.
3: procedure OFFLINECHECKER
4:     Use SAX parser to parse $f$
5:     Extract relevant detection fields, i.e., $id$, $PolicyType$, $type$, $priorities$ and save them into an array called $CDB$.
6:     Execute the grouping process using Algorithm 2 to obtain the sets $G_{vnfID\_PolicyType}$ and $G_{VNFs\_Placement}$ of groups $G$.
7:     for each group $g \in G$ do
8:         Execute the policy analysis using Algorithm 4.
9:     end for
10:     if group $g \in G_{VNFs\_Placement}$ then
11:         Execute the placement policy analysis using Algorithm 5.
12:     end if
13: end procedure

FIG. 13

Algorithm 2: Grouping Algorithm

1: Input: set of VNF Nodes
2: Input: $CDB$ containing the detection fields $id$, $PolicyType$, $FunctionNodes$, etc.
3: Output: Set of groups containing a list of policies each.
4: procedure GROUPING
5:     for each node $vnfID \in VNF - Nodes$ do
6:         Create a group $G_{vnfID\_PolicyType}$ for each defined PolicyType
7:     end for
8:     Create a group $G_{VNFs\_Placement}$ for policies that include more than one VNF
9:     for each policy $p \in CDB$ do
10:         if $p$ pertains to the VNF-node of group $G_{vnfID\_PolicyType}$
11:             $G_{vnfID\_PolicyType} = G_{vnfID\_PolicyType} \cup p$
12:         if $p$ pertain to more than one vnf-node
13:             $G_{VNFs\_Placement} = G_{VNFs\_Placement} \cup p$
14:     end for
15: end procedure

FIG. 14

```
Algorithm 3: Policy Relation
 1: Input: two policies P_x and P_y.
 2: Input: CDB containing the detection fields id, PolicyType,
    FunctionNodes, etc.
 3: Output: A binary string relation identify the relationship among the
    policies.
 4: procedure POLICYRELATION
 5:     if P_x.PolicyType == "Placement" then
 6:         if P_x.functionNodeA == P_y.functionNodeA then
 7:             relation.add(1)
 8:         else
 9:             relation.add(0)
10:         end if
11:         if P_x.functionNodeB == P_y.functionNodeB then
12:             relation.add(1)
13:         else
14:             relation.add(0)
15:         end if
16:         if P_x.type == P_y.type then
17:             relation.add(1)
18:         else
19:             relation.add(0)
20:         end if
21:         if P_x.location == P_y.location then
22:             relation.add(1)
23:         else
24:         relation.add(0)
25:         end if
26:         if P_x.locationType == P_y.locationType then
27:             relation.add(1)
28:         else
29:             relation.add(0)
30:         end if
31:     else
32:         if P_x.functionNodeA == P_y.functionNodeA then
33:             relation.add(1)
34:         else
35:             relation.add(0)
36:         end if
37:         if P_x.policyType == P_y.policyType then
38:             relation.add(1)
39:         else
40:             relation.add(0)
41:         end if
42:         if P_x.type == P_y.type then
43:             relation.add(1)
44:         else
45:             relation.add(0)
46:         end if
47:         if P_x.conditions == P_y.conditions then
48:             relation.add(1)
49:         else
50:             relation.add(0)
51:         end if
52:     end if
53: end procedure
```

FIG. 15

Algorithm 4: Policy Analysis

1: Input: a group $g$ containing policies $p$.
2: Output: Set $conflict\_set$ of conflicted rules.
3: Output: Set $redundant\_set$ of redundant rules.
4: procedure POLICYANALYSIS
5:    for $i$ FROM $0 \longrightarrow g.length - 1$ do
6:       for $j$ FROM $i \longrightarrow g.length$ do
7:          Execute the policy relation process using Algorithm 3 with $(g[i], g[j])$ and store the relations into the binary string $relation$
8:          if $relation \in \{10100, 10010, 11001, 1110, 1101\}$ then
9:             $conflict\_set = conflict\_set \cup \{g[i], g[j]\}$
10:         else if $relation \in \{10110, 11101, 1111\}$ then
11:            $redundant\_set = redundant\_set \cup \{g[i], g[j]\}$
12:         end if
13:       end for
14:    end for
15: end procedure

FIG. 16

Algorithm 5: Placement Policy Analysis

1: Input: a group $g$ containing policies $p$.
2: Output: Set $conflict\_set$ of conflicted rules.
3: procedure PLACEMENTPOLICYANALYSIS
4:    for each policy $p \in$ group $g$ do
5:       Create a temporary array $t_1$ such that $t_1 \leftarrow$ placement group of $[p.FunctionNodeA]$
6:       Create a temporary array $t_2$ such that $t_2 \leftarrow$ placement group of $[p.FunctionNodeB]$
7:       for $i$ FROM $0 \longrightarrow t_1.length$ do
8:          for $j$ FROM $1 \longrightarrow t_2.length$ do
9:             Execute the policy relation process using Algorithm 3 with $(t_1[i], t_2[j])$ as inputs.
10:         end for
11:       end for
12:       if $relation \in \{00100, 00010\}$ then
13:          $conflict\_set = conflict\_set \cup \{p, t_1[i], t_2[j]\}$
14:       end if
15:    end for
16: end procedure

FIG. 17

Algorithm 6: Real-time policy checker

1: Input: A new Policy $P_x$.
2: Input: A group $G$ with a list $P$ of policies.
3: Output: Analysis Report with conflicted and redundant rule sets.
4: procedure REALTIMECHECKER
5:     for each policy $P$ in group $G$ do
6:         Execute the policy relation process using Algorithm 3 with ($P$, $P_x$) as inputs.
7:         if $relation \in \{10100, 10010, 11001, 1110, 1101\}$ then
8:             $conflict\_set = conflict\_set \cup \{p, P_x\}$
9:         else if $relation \in \{10110, 11101, 1111\}$ then
10:             $redundant\_set = redundant\_set \cup \{p, P_x\}$
11:         end if
12:     end for
13: end procedure

FIG. 18

Algorithm 7: Policies Resolution Engine

1: Input: Analysis report $A$ containing the conflicting and redundant sets.
2: Input: $CDB$ containing the detection fields $id$, $PolicyType$, $globalPriority$, $localPriority$, etc.
3: Output: Policies are free of conflicts and redundancies.
4: procedure POLICIESRESOLUTION
5:     for each statement $S$ in $A$ do
6:         for each Policy $P$ in $S$ do
7:             Get the globalPriority $Gp$
8:             Get the localPriority $Lp$
9:         end for
10:         if $Gp$ values are not identical then
11:             Delete $P$ that has lower $Gp$
12:         else if $Gp$ values are identical then
13:             Delete $P$ that has lower $Lp$
14:         else if both $Gp$, $Lp$ are identical then
15:             inform the policy author i.e., customer, provider to choose which policy should be removed
16:         end if
17:     end for
18: end procedure

FIG. 19

SEMANTIC DETECTION AND RESOLUTION OF CONFLICTS AND REDUNDANCIES IN NETWORK FUNCTION VIRTUALIZATION POLICIES

TECHNICAL FIELD

Embodiments of the disclosure relate generally to systems and methods for network service management.

BACKGROUND

Network Function Virtualization (NFV) has recently gained increased attention from both academic and industrial circles, thanks to its ability to reduce both the Capital Expenditures (CapEx) and Operational Expenditures (OpEx). NFV has made it possible to shift network functions (e.g., firewall, load balancing, etc.) from expensive hardware equipment to softwarized components that operate on top of commodity hardware as Virtual Network Functions (VNFs). Service providers and/or customers may have special requirements and restrictions regarding the placement, routing, and VNF lifecycle management operations of their Service Function Chain (SFC) requests. For example, an anti-affinity placement policy can be used to allocate the VNFs of the same SFC in separated datacenters (or different physical hosts) to improve the resilience and robustness of their services. Some other requirements may include legislative, efficiency, economic, and privacy issues. These requirements and restrictions may be specified as policies attached to the SFC requests.

However, as these policies come from multiple sources (e.g., a service provider, a network administrator, a cloud provider, an NFV-Orchestrator and network service customers/clients), conflicts and redundancies may exist among the policies. For example, a conflict is encountered if a provider requests two VNFs of the same type to co-locate on the same host, and that all instances of such a VNF type reside in different datacenters. Another example of a conflict is when a provider or a client identifies 80% as a threshold value for a VNF to scale out; thereafter an NFV-Orchestrator adds a new policy with a threshold value different from 80%.

The aforementioned conflicts and redundancies constitute serious problems to the network service as a whole and entail negative impacts such as Service-Level Agreement (SLA) violation and performance degradation. The existence of conflicts and redundancies in the policies may lead to wrong decision-making in terms of VNF placement and resource adaptation (e.g., scaling and migration). It also adds extra overhead to process policy management operations.

Therefore, there is a need for a mechanism which detects potential conflicting or redundant policies in SFC requests, and resolves the detected policies.

SUMMARY

In one embodiment, there is provided a method for managing policies to provide a network service in an NFV environment. The method comprises: obtaining, from service requests, the policies specifying placement and lifecycle management of VNFs; extracting, from each policy, attribute values including at least a policy type value which specifies an action performed by the policy; grouping the policies into a plurality of groups based on the attribute values, wherein the policies in a same group share at least a common policy type value; comparing the attribute values within each group to detect conflicts and redundancies before deployment of the network service and in real-time after the network service is deployed; and removing one or more of the obtained policies to produce a policy repository free of the conflicts and the redundancies.

In another embodiment, there is provided a network node comprising processing circuitry and memory. The memory contains instructions executable by the processing circuitry for managing policies to provide a network service in an NFV environment. The network node is operative to obtain, from service requests, the policies specifying placement and lifecycle management of VNFs; extract, from each policy, attribute values including at least a policy type value which specifies an action performed by the policy; group the policies into a plurality of groups based on the attribute values, wherein the policies in a same group share at least a common policy type value; compare the attribute values within each group to detect conflicts and redundancies before deployment of the network service and in real-time after the network service is deployed; and remove one or more of the obtained policies to produce a policy repository free of the conflicts and the redundancies.

In yet another embodiment, there is provided a network node operable to manage policies to provide a network service in an NFV environment. The network node comprises:

a policy input module adapted to obtain, from service requests, the policies specifying placement and lifecycle management of VNFs; an attribute value extraction module adapted to extract, from each policy, attribute values including at least a policy type value which specifies an action performed by the policy; a grouping module adapted to group the policies into a plurality of groups based on the attribute values, wherein the policies in the same group share at least a common policy type value; a comparison module adapted to compare the attribute values within each group to detect conflicts and redundancies before deployment of the network service and in real-time after the network service is deployed; and a resolution module adapted to remove one or more of the obtained policies to produce a policy repository free of the conflicts and the redundancies.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIG. 8 illustrates an example of a policy file according to one embodiment.

FIG. 9 illustrates a formal description of placement policies according to one embodiment.

FIG. 10 illustrates a formal description of VNF lifecycle management policies according to one embodiment.

FIG. 11 illustrates two examples of conflicting policies.

FIG. 12 illustrates one example of conflicting policies and one example of redundant policies.

FIG. 13 illustrates Algorithm 1, which describes the operations of an offline policy checker according to one embodiment.

FIG. 14 illustrates Algorithm 2, which describes a grouping process according to one embodiment.

FIG. 15 illustrates Algorithm 3 for analyzing the relationships among the actions of placement, scaling and migration according to one embodiment.

FIG. 16 illustrates Algorithm 4, which describes the analysis of affinity and anti-affinity policies according to one embodiment.

FIG. 17 illustrates Algorithm 5 for detecting potential conflicts among different VNFs' policies according to one embodiment.

FIG. 18 illustrates Algorithm 6, which describes the operations of a real-time policy checker according to one embodiment.

FIG. 19 illustrates Algorithm 7, which describes the operations performed by a policies resolution engine to resolve conflicts and redundancy between policies according to one embodiment.

DETAILED DESCRIPTION

Reference may be made below to specific elements, numbered in accordance with the attached figures. The discussion below should be taken to be exemplary in nature, and should not be considered as limited by the implementation details described below, which as one skilled in the art will appreciate, can be modified by replacing elements with equivalent functional elements.

Embodiments of the invention provide a detection and analysis mechanism and an automated resolution mechanism to identify and resolve conflicts and redundancies among policies for VNFs. The policies include affinity and anti-affinity policies, which may come from multiple policy sources such as service providers, customers and NFV Orchestrator (NFVO). Each policy specifies a placement action or a lifecycle management action (e.g., scaling and migration) for VNFs. The detection and analysis mechanism and the automated resolution mechanism operate both offline before network service deployment, and in real-time after the network service deployment when new policies are received.

The present invention will be explained according to specific embodiments, in particular the NFV embodiments. It should be understood that the present invention is not limited by the NFV embodiments and is applicable to different embodiments that are not related to the NFV.

In the following description, the terms "constraint" and "policy" are used interchangeably, the terms "VNF instance" and "VNF nodes" are used interchangeably, the terms "virtual network interconnecting paths" and "virtual paths" are used interchangeably, and the terms "policy source" and "policy author" are used interchangeably.

Figure 1:
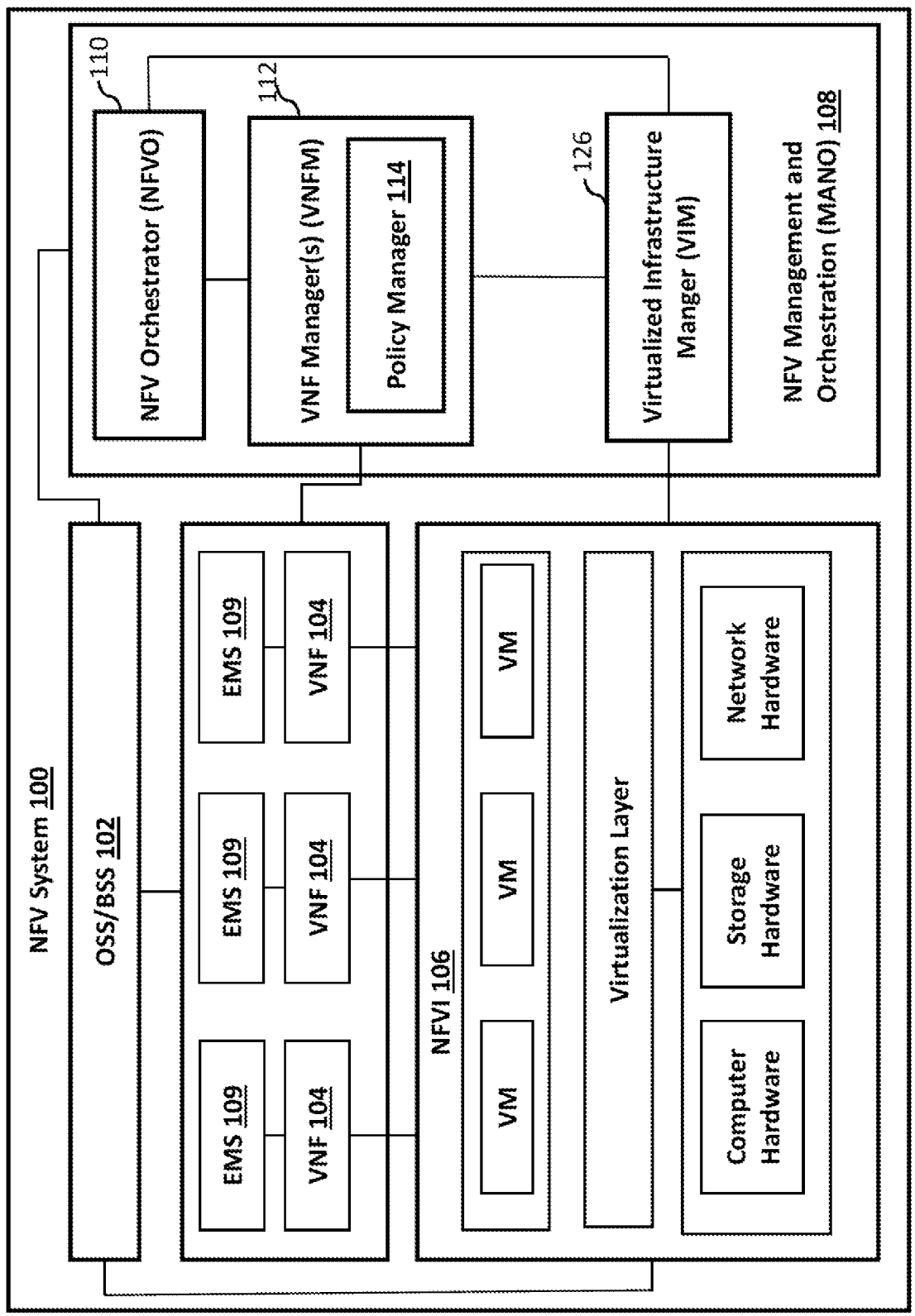
FIG. 1 is a block diagram illustrating an NFV system in which embodiments of the invention may operate.

FIG. 1 is a block diagram illustrating an NFV system 100 in which embodiments of the invention may operate. In this embodiment, the NFV system 100 includes Operation Support System/Business Support System (OSS/BSS) 102, VNFs 104, NFV Infrastructure (NFVI) 106, and an NFV Management and Orchestration (MANO) layer 108. The MANO layer 108 manages, controls and handles the overall operations of the VNFs (via Element Management Systems (EMSs) 109) and the NFVI 106.

The MANO layer 108 includes an NFVO 110, VNF Managers (VNFM) 112, and a Virtualized Infrastructure Manager (VIM) 126. The MANO layer 108 is a key layer in the NFV system 100. According to an embodiment of the invention, the VNFM 112 within the MANO layer 108 further includes a policy manager 114.

The policy manager 114 enables multiple policy sources (e.g., network operators, service providers, cloud customers, the NFVO 110, etc.) to define policies based on the network state and the Service Level Agreement (SLA) before a network service is deployed. Furthermore, after the network service is deployed, the NFVO 110 or any authorized entity (e.g., network operators, service providers, cloud customers, etc.) may add a new policy to the SFC based on the monitored information of each VNF.

Enabling multiple policy sources to define policies and add the policies to SFC requests may lead to conflicting and/or redundant policies. The policy manager 114 detects and resolves conflicting policies and redundant policies for placement and lifecycle management actions (e.g., scaling and migration). In one embodiment, the policy manager 114 operates to filter out (i.e., remove or delete) the conflicting and redundant policies.

Figure 2:
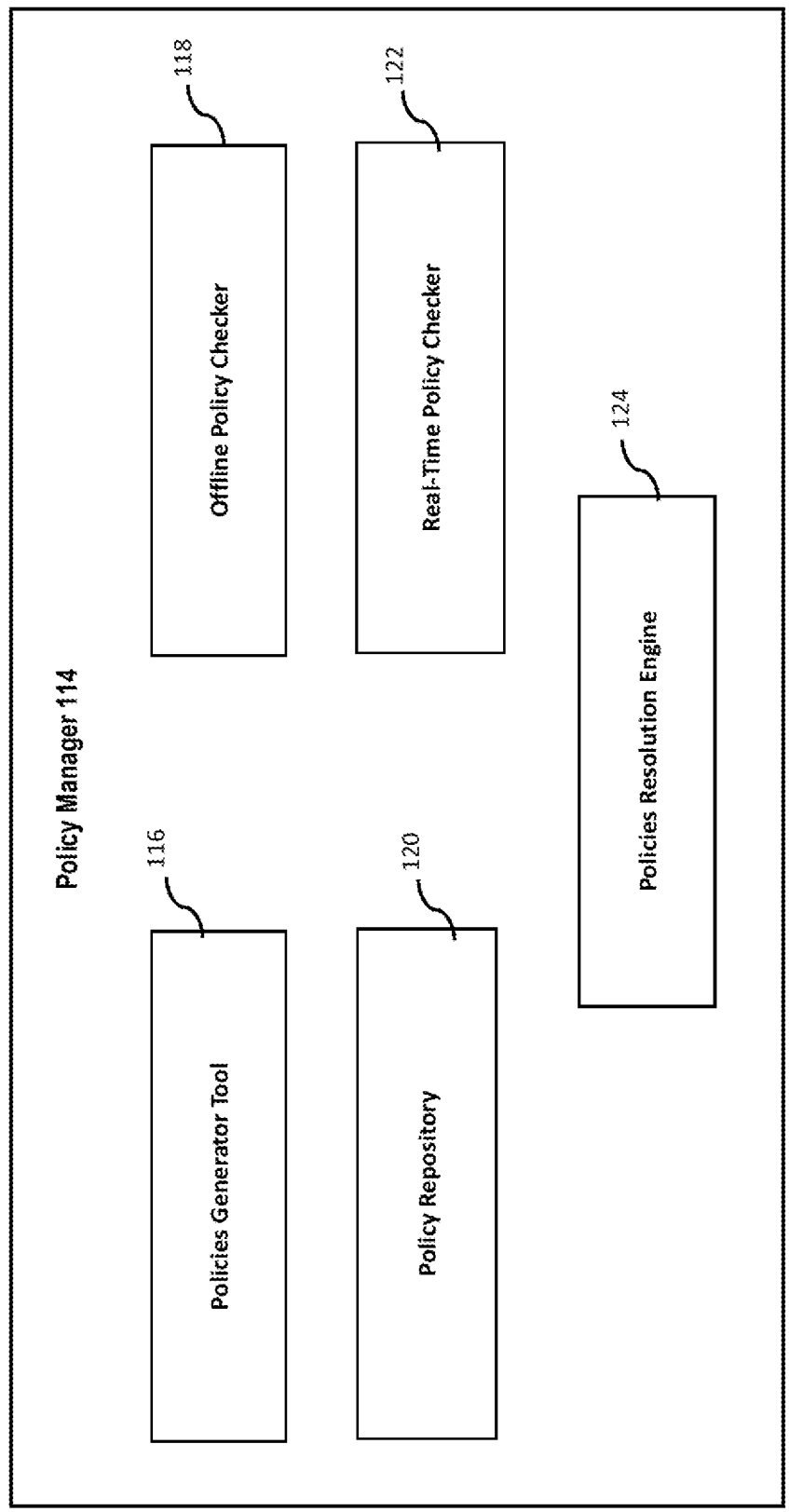
FIG. 2 illustrates the components of a policy manager according to one embodiment.

FIG. 2 illustrates components of the policy manager 114 according to one embodiment. The policy manager 114 includes five components: a policies generator tool 116, an offline policy checker 118, a policy repository 120, a real-time policy checker 122 and a policies resolution engine 124. In one embodiment, the policies generator tool 116 generates a policy file which contains all the policies obtained from the policy sources. The policy repository 120 is a database containing all the validated policies that are free of conflicts and redundancies. The offline policy checker 118 detects conflicts and redundancies in the obtained policies before the instantiation and deployment of the network service. The real-time policy checker 122 detects conflicts and redundancies when a new policy is added to the deployed network service. The policies resolution engine 124 automatically resolves the conflicts and redundancies between policies that are detected by the offline policy checker 118 and the real-time policy checker 122. In one embodiment, the policy manager 114 and the component therein may be provided by a network node (e.g., embodiments shown in FIG. 21 and FIG. 22), which includes processing circuitry such as processor(s) to perform the operations of the policy manager 114.

In one embodiment, each policy defined and added by a policy source may be an affinity policy or an anti-affinity policy. Both the affinity policies and the anti-affinity policies are applicable to the placement and the lifecycle management of VNFs. More specifically, the policies may include the following. (1) Affinity policies and anti-affinity policies concerning placement and locations. (2) Affinity policies and anti-affinity policies concerning VNF lifecycle management (e.g., scaling policy, migration policy, etc.). Placement policies may be used to allocate VNFs and/or virtual paths onto specific physical location. In the embodiments described herein, placement policies may be applied to a set virtual functionalities, where the term "virtual functionality" refers to a VNF instance (i.e., VNF node), VNF type or a virtual path. A virtual functionality value is a specification of one or more VNFs to which a policy applies. The placement locations may have different physical location types such as hosts, datacenters, network domains, cities, countries, etc.

Regarding the placement policies, "affinity" is defined as "co-location," which specifies that a virtual functionality is to be placed in a physical location or share a physical resource with another virtual functionality. "Anti-Affinity" is defined as "non-co-location," which specifies that a virtual functionality is not be placed in a physical location or does not share a physical location with another virtual functionality.

VNF management policies are a set of policies concerning the lifecycle management operations of VNFs such as scaling and migration. Service providers and/or cloud customers may request these policies based on network conditions and SLA. The policies may be used to define a set of conditions to manage the VNF resources (e.g., central processing unit (CPU) cores, memory size, etc.), to control the horizontal and vertical scaling operations by defining the maximum/minimum number of instances and maximum/minimum number of CPU cores for each VNF respectively, to define the threshold values for triggering scaling or migration, to define a migration type (e.g., pre-copy, post-copy, hybrid, etc.) for a VNF, or to disable a certain operation (e.g., migration, scaling) on a specific VNF.

With respect to VNF lifecycle management, "affinity" is defined as "allow/permit," which indicates that the mentioned policies are applicable to the specific VNF. "Anti-Affinity" is defined as "not allow/deny," which indicates that the mentioned policies are not applicable to a specific VNF.

More specifically, an SFC request may include one or more affinity policies and/or one or more anti-affinity policies. These affinity/anti-affinity policies may be described in a natural language and related to a set of VNF policy actions such as placement, scaling and migration. The affinity and anti-affinity policies may be placement-oriented policies in the following policy formats:

Affinity (LocationA, B): Where B is a specific VNF instance, VNF type or virtual network interconnecting path, and LocationA is a specific physical location (i.e., physical node, datacenter, network domain, city, etc.). This policy specifies that virtual functionality B is to be placed in LocationA.

Anti-Affinity (LocationA, B): This policy specifies that virtual functionality B is not to be placed in LocationA.

Affinity (LocationTypeA, B, C): Where B and C are specific VNF instances, VNF types or virtual network interconnecting paths, and LocationTypeA is a type of a physical location (i.e., datacenter, network domain, physical host, etc.). This policy specifies that both B and C is to co-locate on the same physical resource with respect to LocationTypeA. For example, Affinity (DC, VNF 1, VNF 2) specifies that both VNF 1 and VNF 2 are to be co-located in the same datacenter (DC).

Anti-Affinity (LocationTypeA, B, C): This policy specifies that both B and C are not to be placed on the same physical resource with respect to the mentioned LocationTypeA.

Moreover, the affinity and anti-affinity policies may be VNF management-oriented policies in the following format:

Affinity (PolicyType, Conditions, A): A is a specific VNF instance, PolicyType refers to a specific management operation/action (i.e., vertical scaling, horizontal scaling or migration), and Conditions are the restrictions on the PolicyType (i.e., minimum/maximum number of instances, minimum/maximum number CPU cores, migration type, or the threshold values according to which scaling is to be triggered).

Anti-Affinity (PolicyType, Conditions, A): This policy specifies that PolicyType is to be disabled on A. For example, Anti-Affinity (vertical scaling, null, VNF 3) specifies that the vertical scaling policy is disabled for VNF 3.

In one embodiment, all the affinity and anti-affinity policies are translated and re-formulated using eXtensible Markup Language (XML). These policies may be structured and defined using XML Schema Definitions (XSD).

The following description provides further details on the policies according to one embodiment. Each policy P may be represented as P={Id, PolicyType, type, globalPriority, localPriority, Targets, Conditions}. Id is the policy identifier (e.g., $p_1$, $p_2$, . . . , $p_n$); PolicyType represents the type of actions that the policy is created for (e.g., placement, horizontal scaling, vertical scaling, or migration); type is the type of the underlying policy, which can be either affinity or anti-affinity; and globalPriority defines the global priority of the policy (e.g., Critical, High, Medium, Low, VeryLow). globalPriority may be used to determine the priorities of policies' authors (i.e., policy sources such as service provider, customer, NFVO, etc.). For example, in some cases the policies defined by a service provider have higher priorities than policies defined by a customer. localPriority is designated by the policy source and determines the local priority of policies (e.g., Critical, High, Medium, Low, VeryLow); Targets is a set which depicts the VNF instance, VNF type, virtual path and/or location specification; i.e., Targets={FunctionNodes, FunctionTypes, Connections, Location, LocationType}; and Conditions={$Condition_1$, $Condition_2$, . . . , $Condition_n$} is a set of restrictions to the policy actions (i.e., scaling and migration) such as maximum/minimum number of VNF instances, migration type, CPU utilization threshold values, etc.

Figure 3:
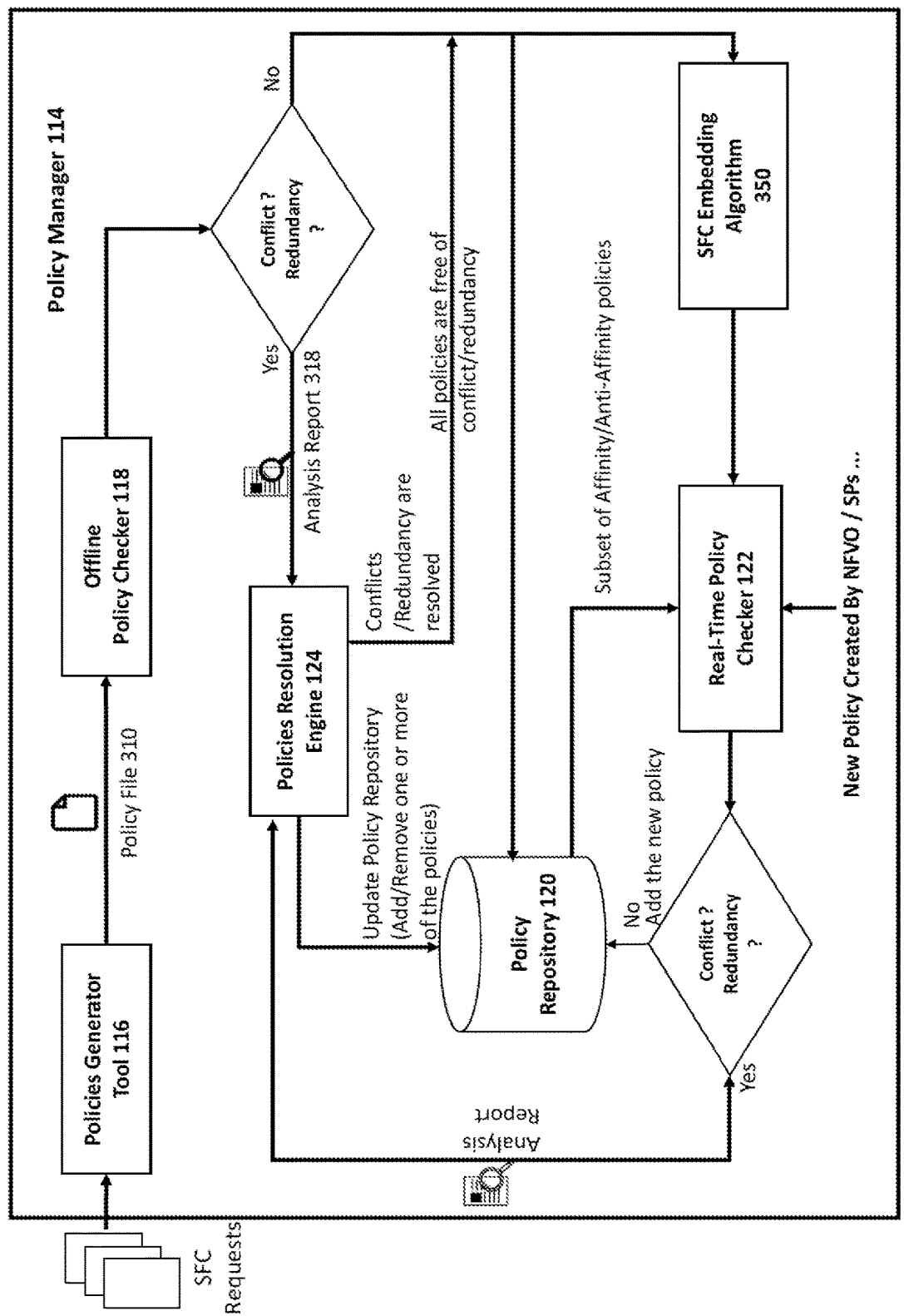
FIG. 3 illustrates a high-level overview of the operations performed by a policy manager according to one embodiment.

FIG. 3 illustrates a high-level overview of the operations performed by the policy manager 114 according to one embodiment. Upon receiving an SFC request, the policy manager 114 obtains from the request all the attached policies (e.g., a set of affinity and anti-affinity policies). The policies generator tool 116 generates a policy file 310 (e.g., an XML-based policy file) which may be translated from a natural language into XML. The policy file 310 contains the affinity and anti-affinity policies, each of which describes a placement, scaling or migration action.

The policy file 310 is sent to the offline policy checker 118 as input. The offline policy checker 118 detects conflict and/or redundancy, if any, among the affinity/anti-affinity policies in the policy file 310. The output of the offline policy checker 118 is an analysis report 318 containing the detected policies that are redundant of and/or in conflict with one another. These conflicting/redundant policies are then sent to the policies resolution engine 124. The policies resolution engine 124 automatically, without the assistance of an administrator, resolves the detected conflicts and redundancies in the policies by keeping the policies with a higher priority, and deleting the policies with a lower priority. When all the conflicts/redundancies are resolved, all the approved and validated policies (i.e., the policies that are kept by the policies resolution engine 124) are stored into the policy repository 120 as groups. Then, an SFC embedding process 350 is launched to allocate each VNF to a corresponding physical resource, while respecting the affinity/anti-affinity placement constraints specified as inputs to the process. After the placement is performed, each VNF is continuously monitored by the MANO layer 108, and the real-time policy checker 122 is invoked to guarantee that the existing affinity/anti-affinity policies are not violated with the arrival of new policies that may be added by the NFVO or a network administrator.

Figure 4:
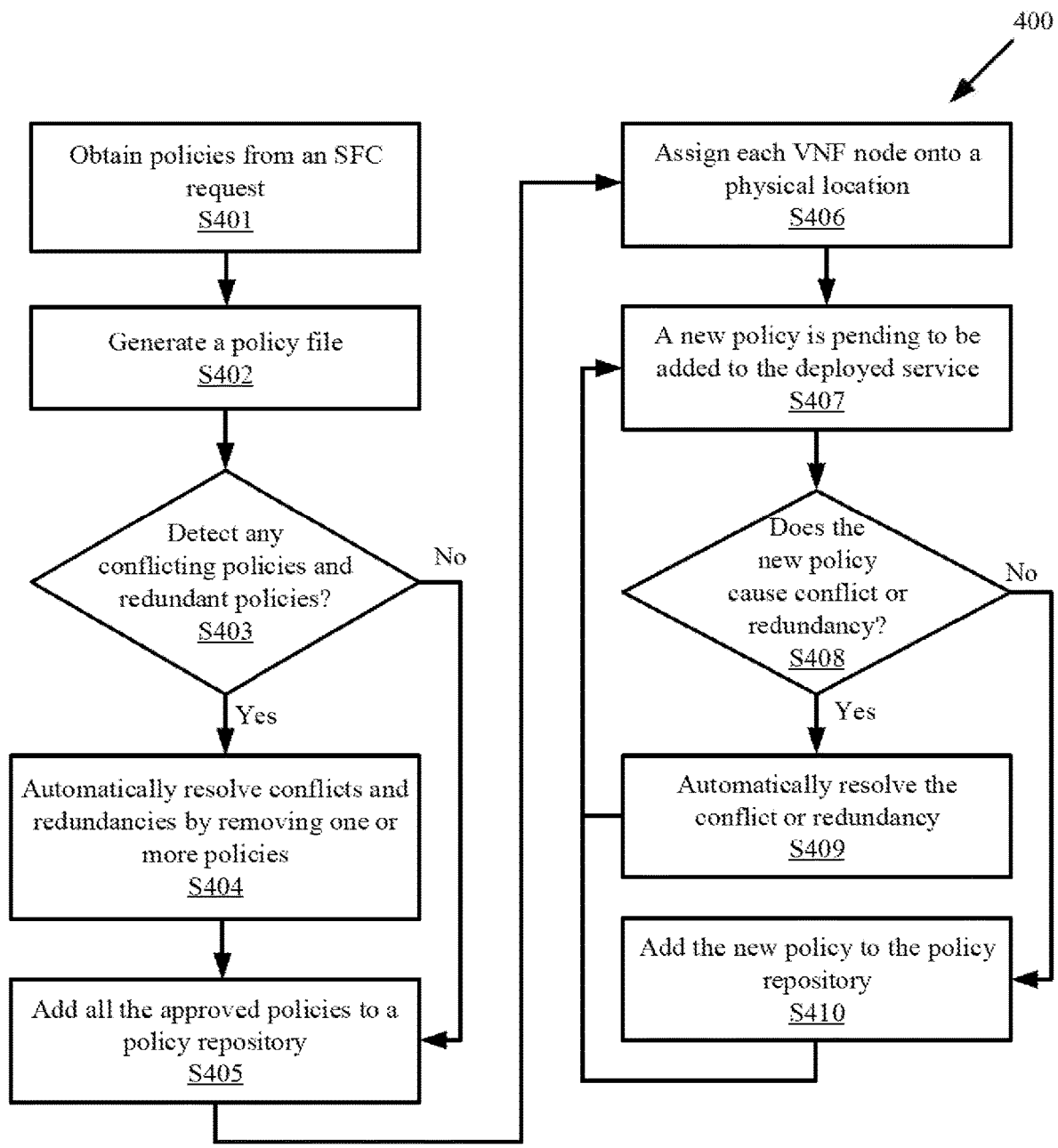
FIG. 4 is a flow diagram illustrating a method performed by a policy manager according to one embodiment.

FIG. 4 is a flow diagram illustrating a method 400 performed by the policy manager 114 according to one embodiment. Referring also to FIG. 3, the method 400 is triggered when an SFC request is received. The policy manager 114 at step S401 obtains all the attached affinity and anti-affinity policies from the SFC request. The policies generator tool 116 may translate all the obtained policies into an XML format. The policies generator tool 116 generates the policy file 310 at step 402. The policy file 310 contains all the affinity and anti-affinity policies regarding the placement/location, scaling and migration actions. The generated policy file 310 may be an XML file.

When the policy file 310 is generated, the offline policy checker 118 is invoked to validate all the policies in the policy file 310. The offline policy checker 118 detects conflicting policies and redundant policies in the policy file 310 at step S403. If the offline policy checker 118 detects any conflicting or redundant policies at step S403, the policies resolution engine 124 is notified to automatically resolve the conflicts and the redundancy issues by removing one or more of the policies at step S404. The operation of the offline policy checker 118 is to be described in detail later with reference to FIG. 5.

After the policies resolution engine 124 resolves the conflicts and the redundancy issues, all the remaining policies are approved policies. These approved policies are added into the policy repository 120 at step S405. In the policy repository 120, all the policies are categorized (i.e., grouped). Each category contains the same virtual functionality or functionalities (e.g., VNF node(s), VNF type(s) or virtual path(s)) and the same action (i.e., the same PolicyType value such as placement, scaling or migration). More specifically, all the policies in the same group share a common virtual functionality value and a common PolicyType value. By sharing a common virtual functionality value, it means that all the policies in the same group have the same number of VNF nodes or the same number of VNF types.

At step S406, the SFC embedding algorithm 350 is invoked to assign and map each VNF node onto a specific physical location. The SFC embedding algorithm 350 respects the affinity and anti-affinity location policies that are attached to the SFC requests.

When a network service is deployed, each VNF is monitored. Based on the monitored information, the NFVO 110, a network administrator or a cloud customer may decide to add a new policy to the deployed service. When the new policy is pending to be added into the policy repository 120 at step S407, the real-time policy checker 122 at step S408 determines whether or not the new policy is in conflict with or redundant of the policies stored in the policy repository 120. If at step S408 it is determined that there is a conflict or redundancy issue, the policies resolution engine 124 is notified to automatically resolve the conflict or redundancy issue at step S409. The conflict or redundancy issue may be resolved by rejecting the new policy, modifying the new policy, or removing a stored policy and adding the new policy. If at step S408 it is determined that there is no conflict or redundancy issue at step S408, the new policy is added to the policy repository 120 at step S410. The real-time policy checker 122 provides a continuous conflict and redundancy policy detection and validation. The operation of the real-time policy checker 122 is to be described in detail later with reference to FIG. 6.

Figure 5:
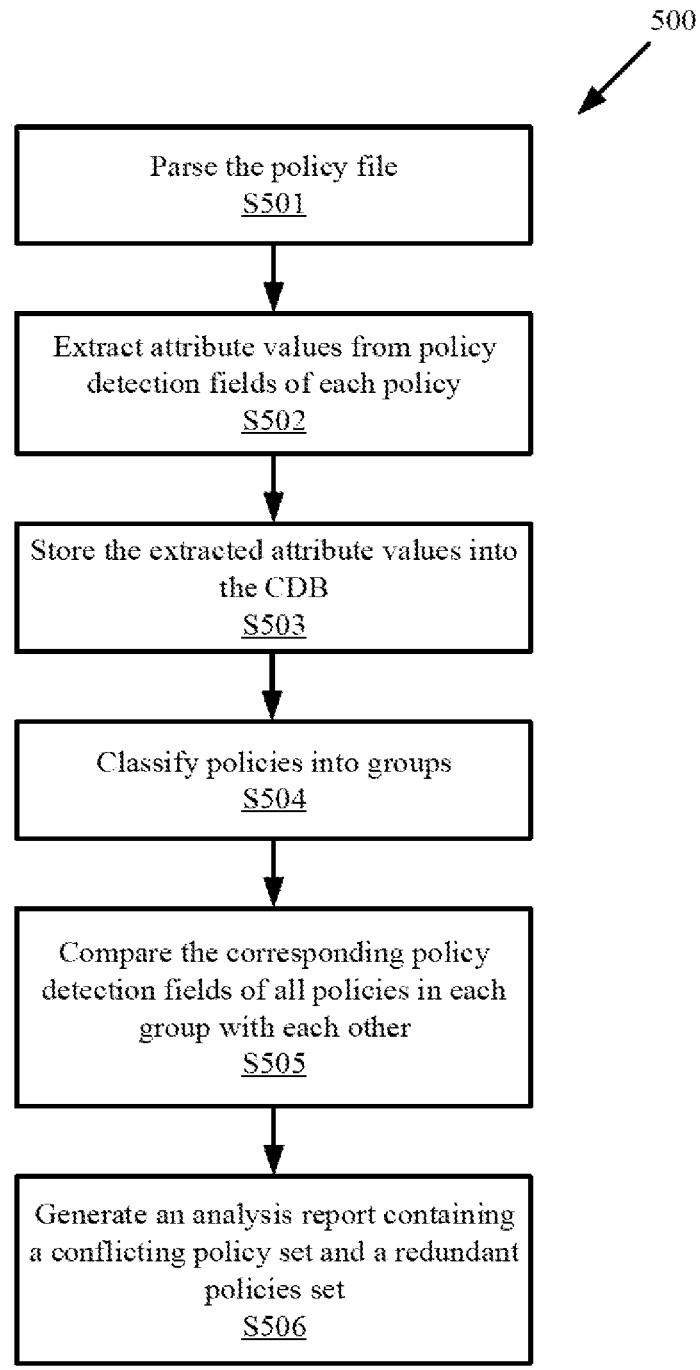
FIG. 5 is a flow diagram illustrating a method performed by an offline policy checker according to one embodiment.

FIG. 5 is a flow diagram illustrating a method 500 performed by the offline policy checker 118 according to one embodiment. The offline policy checker 118 checks and validates the received policies before the instantiation of the requested network service.

The offline policy checker 118 is invoked when the policies generator tool 116 generates the policy file 310 containing affinity and anti-affinity policies for placement, scaling and migration. At step S501, the offline policy checker 118 starts by parsing the policy file 310. After parsing, the offline policy checker 118 extracts attribute values from policy detection fields of each policy at step S502. The policy detection fields include, but are not limited to: Id, PolicyType, type, Priorities, FunctionNodes, FunctionTypes, Connections, Location, LocationType, Conditions. The value stored in each policy detection field is referred to as an attribute value.

At step S503, the extracted attribute values are stored into a Constraints Detection Base (CDB). The CDB is a database, which stores each policy as a record with the policy detection fields. Thus, attribute values may be retrieved from the CDB, which can be performed more quickly than from the policy file 310.

A set of groups is created and each policy in the CDB is classified into one of the groups at step S504. All of the policies that are bounded to the same virtual functionality and the same action (i.e., the same PolicyType value) are grouped into the same group. For example, all the policies that are tied to the same VNF node (e.g., VNF_A) and for horizontal scaling are placed into one group.

Figure 7:
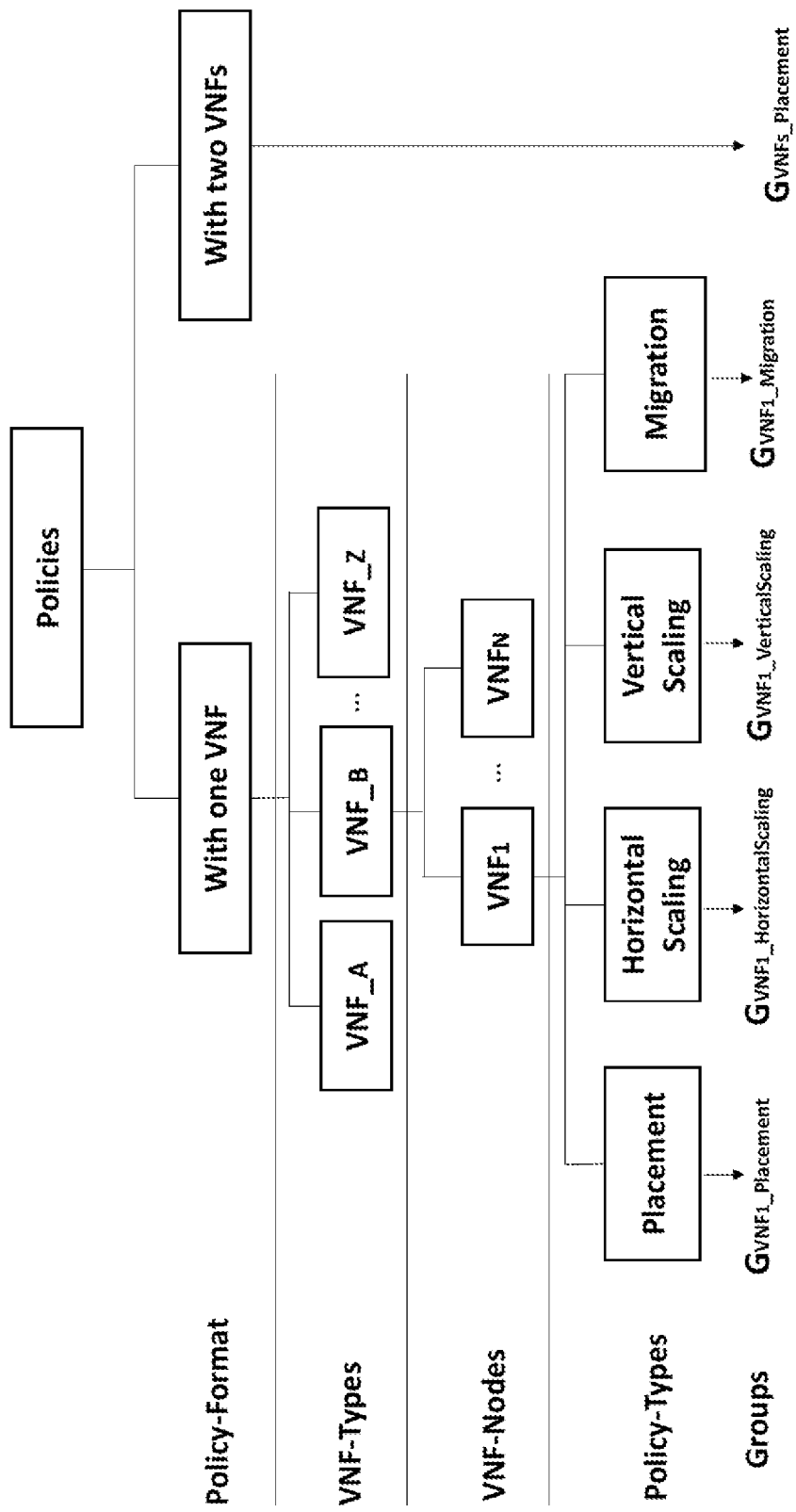
FIG. 7 illustrates an example of a grouping process according to one embodiment.

FIG. 7 illustrates an example of a grouping process according to one embodiment. Further details on grouping will be provided later with reference to Algorithm 2 (FIG. 14). Classifying the policies into different groups at step S504 minimizes the number of comparisons performed between the policies, thus reducing the execution time of the detection and analysis process at step S505. For example, policy grouping removes the comparisons between placement policies and scaling policies.

Referring again to FIG. 5, at step S505, for each of the generated groups, a detection and analysis mechanism is invoked to identify the conflicting and redundant policies by analyzing the relationships between the policy detection fields. At step S505, the corresponding detection fields of all the policies in each group are compared with each other within the group. Based on the similarity and the differences between the corresponding detection fields of the policies, the detection and analysis mechanism identifies the policies that cause conflicts and/or redundancy.

When all the policies are compared with each other in each group, an analysis report is generated at step S506. This analysis report describes the detected conflicting and/or redundant policies. The analysis report generated at step S506 may be delivered to the policies resolution engine 124 in order to resolve the conflict and/or redundancy issues. The operations of the policies resolution engine 124 will be described later with reference to Algorithm 7 (FIG. 19). A network administrator may also be notified of the detected conflict and/or redundancy issues. Thus, when the offline policy checker 118 completes steps S501-S506, all the approved policies (which are free of conflicts and redundancies) are stored into the policy repository 120 according to the classification at step S504. Storing the approved policies into the policy repository 120 reduces the data access and comparison time of the real-time policy checker 122.

When each VNF is assigned to a physical resource and the network service is deployed, if a new policy is added to the deployed service, the policy manager 114 (more specifically, the real-time policy checker 122) ensures that the new policy does not create any conflict or redundancy with the existing policies. The real-time policy checker 122 operates to check and validate the new policy against the policies stored in the policy repository 120.

Figure 6:
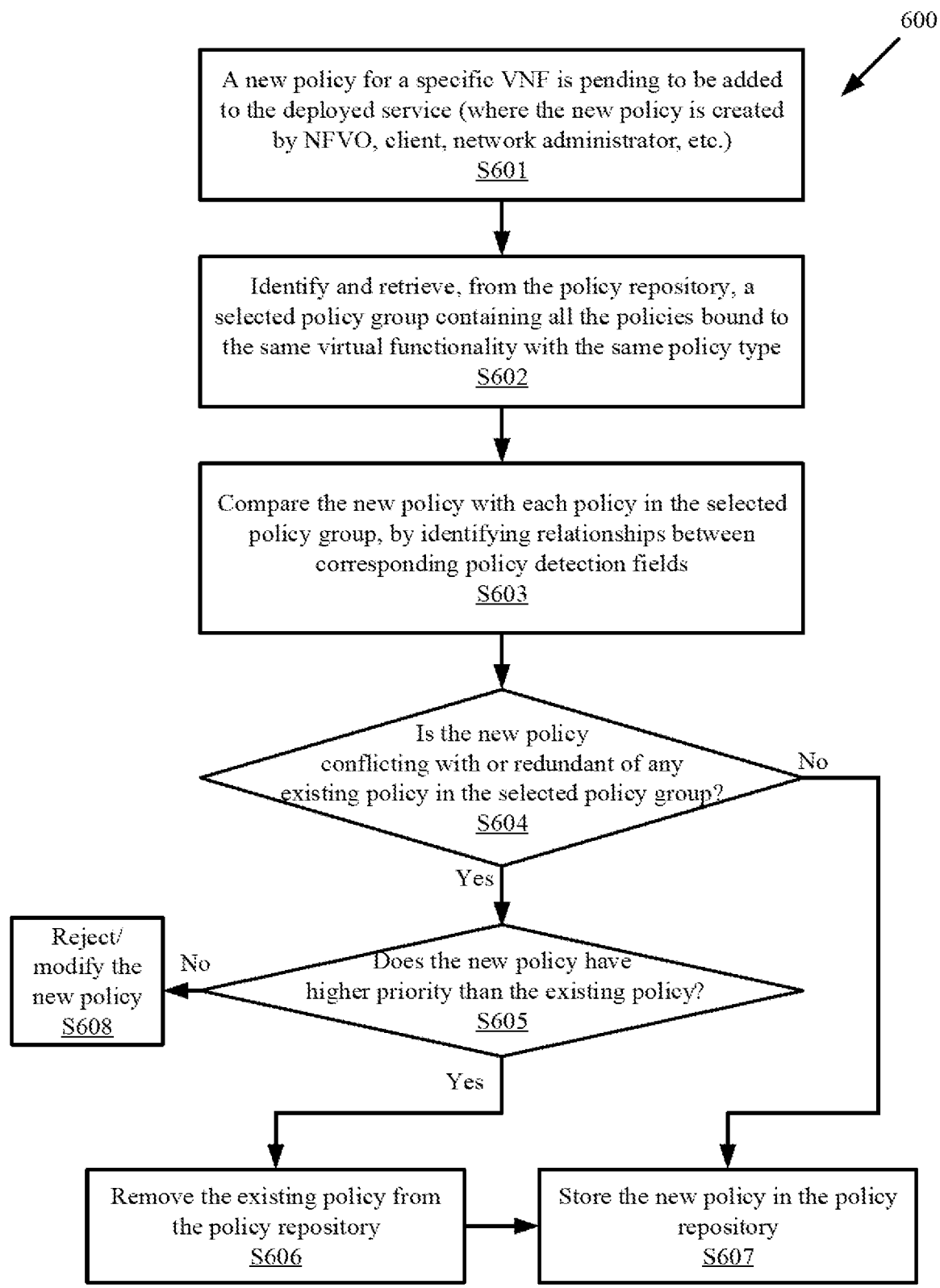
FIG. 6 is a flow diagram illustrating a method performed by a real-time policy checker according to one embodiment.

FIG. 6 is a flow diagram illustrating a method 600 performed by the real-time policy checker 122 according to one embodiment. The real-time policy checker 122 is triggered when an affinity or anti-affinity policy is pending to be added to the network service after the instantiation (i.e., deployment) of the network service at step S601. For example, this new policy may be proposed for a specific VNF and is related to a scaling or migration action. The new policy may be created by an NFVO, a client, or a network administrator, etc.

At step S602, the real-time policy checker 122 identifies and retrieves a selected policy group for the new policy from the policy repository 120. Both the new policy and the selected policy group are bounded to the same virtual functionality and the same action (i.e., the same PolicyType value). The real-time policy checker 122 at step S603 compares the new policy with each policy in the selected policy group, by identifying relationships between corresponding policy detection fields (e.g., location, type and conditions fields).

If the new policy is not conflicting with or redundant of any existing policy in the selected policy group at step S604, the new policy is stored into the policy repository 120 at step S607. If the new policy is conflicting with or redundant of an existing policy in the selected policy group at step S604, the policies resolution engine 124 is invoked. Then, at step S605, the policies resolution engine 124 operates to determine whether the new policy has a higher priority than the existing policy. Based on the determination at step S605, the new policy may replace the existing policy (steps S606 and S607), or be rejected or modified (step S608). The operations of the policies resolution engine 124 will be described in detail later with reference to Algorithm 7 (FIG. 19).

FIG. 8 illustrates an example of a policy file 310 (FIG. 3) in XML according to one embodiment. FIG. 9 illustrates a formal description of XML placement policies using XSD according to one embodiment. FIG. 10 illustrates a formal description of XML VNF lifecycle management policies using XSD according to one embodiment.

Conflicting policies arise when two policies trigger the same action (e.g., the same PolicyType value such as placement, scaling, migration, etc.) for the same virtual functionality (e.g., VNF nodes, VNF types or virtual paths), but one policy has a different type (e.g., affinity or anti-affinity), a different physical location or a different condition from the other. Redundant policies arise when two policies are replicas of each other. FIG. 11 illustrates two examples of conflicting policies, and FIG. 12 illustrates one example of conflicting policies and one example of redundant policies.

Taking Case #1 in FIG. 11 as an example, the offline policy checker 118 or the real-time policy checker 122 may check policies P1 and P2 as follows: P1 conflicts with P2 because both policies are tied to the same functionNodes (VNF_1, VNF_2), same policyType (placement) and same locationType, but with different type (affinity and anti-affinity). As the globalPriority field is "Critical" for P1 and "High" for P2, the conflicts resolution engine 124 keeps P1 and deletes P2 regardless of the localPriority values to resolve the conflict.

In Case #2 of FIG. 11, P3 conflicts with P4 and P5. P3 specifies that both VNF_1 and VNF_2 are to be allocated within the same autonomous system (AS), but both VNFs have a separate policy for allocation in a different AS (VNF_1 allocated to AS1 and VNF2 allocated to AS3). As the globalPriority for P3, P4 and P5 is "High," "High" and "Medium," respectively, the conflicts resolution engine 124 keeps both P3 and P4 regardless of the localPriority values.

FIG. 12 illustrates examples Case #3 and Case #4. In Case #3, P6 conflicts with P7, because both policies are tied to the same VNF node (VNF_3) and the same policyType (Horizontal-Scaling), but with different conditions. Both P6 and P7 have the same globalPriority value, but the localPriority value of P6 is higher. The conflicts resolution engine 124 keeps P6 but not P7 to resolve the conflict. In Case #4, P8 is redundant of P9, as both policies are tied to the same VNF type (Firewall), same policyType (placement), and same location (AS1). As the globalPriority of P8 is higher than P9, the conflicts resolution engine keeps P8 but not P9.

Additional examples are provided below by the following set of affinity and anti-affinity policies P1-P10.
P1=Affinity (DC, VNF A, VNF B)
P2=Anti-Affinity (DC, VNF A, VNF B)
P3=Affinity (AS, VNF 1, VNF 2)
P4=Affinity (AS3, VNF 1)
P5=Affinity (AS1, VNF 2)
P6=Affinity (Horizontal-Scaling, CPU utilization greater than 80%, VNF 5)
P7=Affinity (Horizontal-Scaling, CPU utilization greater than 50%, VNF 5)
P8=Affinity (DC, e4, e6)
P9=Affinity (DC, e4, e6)
P10=Anti-Affinity (AS3, VNF 1)

P1 has a conflict with P2 since both policies have the same function type (i.e., VNF A, VNF B), same PolicyType value (i.e., placement), same location type (datacenter (DC)) but with a different type value (P1 is affinity and P2 is anti-affinity). P3 conflicts with P4 and P5, since P3 specifies that both VNF 1 and VNF 2 are to be allocated within the same autonomous system (AS), but each VNF has a separate policy with different locations (i.e., AS3 and AS1). Similarly, P6 and P7 cause a conflict; both have the same function node (VNF 5) and same PolicyType value (Horizontal-Scaling) but with different conditions. P8 is a replica of P9; hence, both cause a redundancy. P4 is in conflict with P10 since both have the same function node, the same PolicyType value and the same location, but the type value (affinity or anti-affinity) is different.

The following description provides further details of the operations performed by the policy manager 114 in the form of Algorithms 1-7 according to one embodiment.

Algorithm 1 (FIG. 13) is the pseudocode of the offline policy checker 118 according to one embodiment. The input of Algorithm 1 is an XML policy file containing the VNF placement, scaling and migration policies, and the output is a file containing the conflicting and redundant policies sets. The first step is to parse the XML file; e.g., by using the Simple API for XML (SAX) parsing method. An alternative parser may be used instead of the SAX method. Then, the relevant policy detection fields (e.g., Id, PolicyType, type, FunctionNodes, etc.) are extracted and stored into a detection base; e.g., the aforementioned CDB.

Next, a grouping algorithm described in Algorithm 2 is applied to generate a set of groups (e.g., $G_{vnfID\_PolicyType}$ and $G_{VNFs\_Placement}$), each containing a set of relevant policies. For each group obtained in Algorithm 2, a policy analysis process described in Algorithm 4 is performed to detect and analyze conflicting and redundant policies. Another policy analysis process described in Algorithm 5 (FIG. 17) is only performed to the group of type $G_{VNFs\_Placement}$ to extract conflicting and redundant policies relating to more than one VNF.

Algorithm 2 (FIG. 14) describes a grouping process according to one embodiment. Algorithm 2 takes as inputs a set of VNF nodes and the CDB containing the policy detection fields, and the outputs are a set of groups, each containing a list of relevant policies. In the first step of Algorithm 2, a group for each VNF node and each Policy-Type value is created (e.g., VNF1 Placement, VNF1 HorizontalScaling). Similarly, a group is created for the policies related to placement and have the following policy format: Affinity (LocationTypeA, B, C) or Anti-Affinity (LocationTypeA, B, C). Then, the policies contained in the CDB are assigned to the groups that they pertain to.

In Algorithm 3 (FIG. 15), the relationships among the actions of placement, scaling and migration are analyzed. The inputs to Algorithm 3 are two policies Px, Py and the CDB containing the policy detection fields. The output of Algorithm 3 is a binary string "relation," which encodes the relationships between the two policies in a binary format by comparing the corresponding policy detection fields (i.e., 1 in case a relationship exists and 0 otherwise).

Algorithm 4 (FIG. 16) describes the analysis of the affinity and anti-affinity placement, scaling and migration policies according to one embodiment. The input to Algorithm 4 is a group containing a subset of policies, and the outputs are two sets: a conflict set and a redundant set, which contain the policies that are detected to have conflict and redundancy issues. In order to obtain the relationships between two policies' detection fields, Algorithm 3 is called to output a binary string representing the relationships. Then, these relationships are analyzed. If the relationships from the output of Algorithm 3 match one of the following known binary strings, 10100 (i.e., policies having the same functionNodeA and type, but with different location values. The relationships functionNodeB and locationType are "0" since the fields are null); 10010 (i.e., policies having the same functionNodeA and location, but with different type values); 11001 (i.e., policies having the same functionNodeA, functionNodesB and locationType, but with different type values); 1110 (i.e., policies having the same functionNodeA, policyType and type, but with different conditions); or 1101 (i.e., policies having the same functionNodeA, policyType and conditions, but with different type values), then the policies are considered conflicting and added to conflict_Set.

On the other hand, if the relationships from the output of Algorithm 3 match one of the following known binary strings: 10110 (i.e., policies having the same functionNodeA, type and location); 11101 (i.e., policies having the same functionNodeA, functionNodeB, type and locationType); or 1111 (i.e., policies having the same functionNodeA, policyType, type and conditions), then the policies are considered redundant and are added to redundant_Set.

Algorithm 5 (FIG. 17) detects potential conflicts among different VNFs' policies according to one embodiment. The input to Algorithm 5 is a group containing a subset of policies, and the output is a set conflict_Set containing the policies that are detected to have conflicts. First, for each policy of the input group, two temporary arrays are created to hold a copy of the appropriate VNF's placement group. For example, if the policy is related to VNF 1 and VNF 2, then the first temporary group has a copy of placement-group policies bound to VNF 1 (obtained from Algorithm 2), and the second temporary group has a copy of placement-group policies bound to VNF 2. Next, Algorithm 4 is called to analyze the relationships. If the relationships are represented by the binary string 00100 (i.e., policies having the same type, but different functionNodes and location values). For example, Affinity (AS, VNF A, VNF B), Affinity (AS1234, VNF A) and Anti-Affinity (AS1234, VNF B) may be the input to Algorithm 5 and are detected to have conflicts. Similarly, if the relationships are represented by the binary string 00010 (i.e., policies having the same location value but with different type values and functionNodes), then these policies are detected to have conflicts.

Algorithm 6 (FIG. 18) describes the operations of the real-time policy checker 122 according to one embodiment. The real-time policy checker 122 is invoked to provide continuous policy detection. The real-time policy checker 122 prevents conflict and redundancy issues between new and existing policies in real-time. Specifically, network administrators or NFVO may add new policies in response to changes that occur at the virtual network's level. Prior to adding the new policies, the real-time policy checker 122 (Algorithm 6) is invoked to ensure that the new policies do not cause any conflict and redundancy issues.

The real-time policy checker 122 does not compare a new policy with all the policies existing in the policy repository 120. Instead, only a subset of the policies are selected from the policy repository 120 for comparison. The subset of policies include all the policies having the same virtual functionality or functionalities (e.g., VNF node(s), VNF type(s) or virtual path(s)) and the same action (i.e., the same PolicyType such as placement, horizontal scaling, vertical scaling, or migration) as the new policy. For example, if the new policy pertains to VNF node VNF_1 and is for horizontal scaling, only the policies that pertain to VNF_1 and horizontal scaling are extracted from the policy repository 120. This significantly reduces the overhead of the real-time policy validation process.

Algorithm 7 (FIG. 19) describes the operations performed by the policies resolution engine 124 to resolve conflicts and redundancy between policies according to one embodiment. Algorithm 7 takes as inputs an analysis report containing the conflicting and/or redundant policy sets detected by the offline policy checker 118 (Algorithm 1) or the real-time policy checker 122 (Algorithm 6), CDB containing the policy detection fields for each policy, and outputs are the validated policies which are free of conflicts and redundancies. In one embodiment, the policies resolution engine 124 resolves the conflicts and redundancies by comparing the priority values in the policy detection fields. The first step of Algorithm 7 starts with analyzing the analysis report by reading each statement, each statement has a conflict of redundancy case between policies. From the CDB, the globalPriority and localPriority attribute values are obtained for each policy. As described above, the attribute values in globalPriority are used to identify the priorities of policies' authors (e.g., policies defined by the customer are more important than policies defined by the service provider, or vice versa), the attribute values in localPriority are used to identify the priority of each policy defined by the policy author itself. To decide which policy is to be removed, the policies resolution engine 124 (Algorithm 7) resolves the conflicts/redundancies by the following operations.

The policies resolution engine 124 first compares the globalPriority values. If the globalPriority values are not equal, then the policy with a lower globalPriority value is deleted. If the globalPriority values are equal, the localPriority values are compared. The policy with the lower localPriority value is deleted. If both the globalPriority and the localPriority values are identical, the policies resolution engine 124 requests the policy author to decide which policy to remove to solve the conflicts and/or redundancies.

Figure 20:
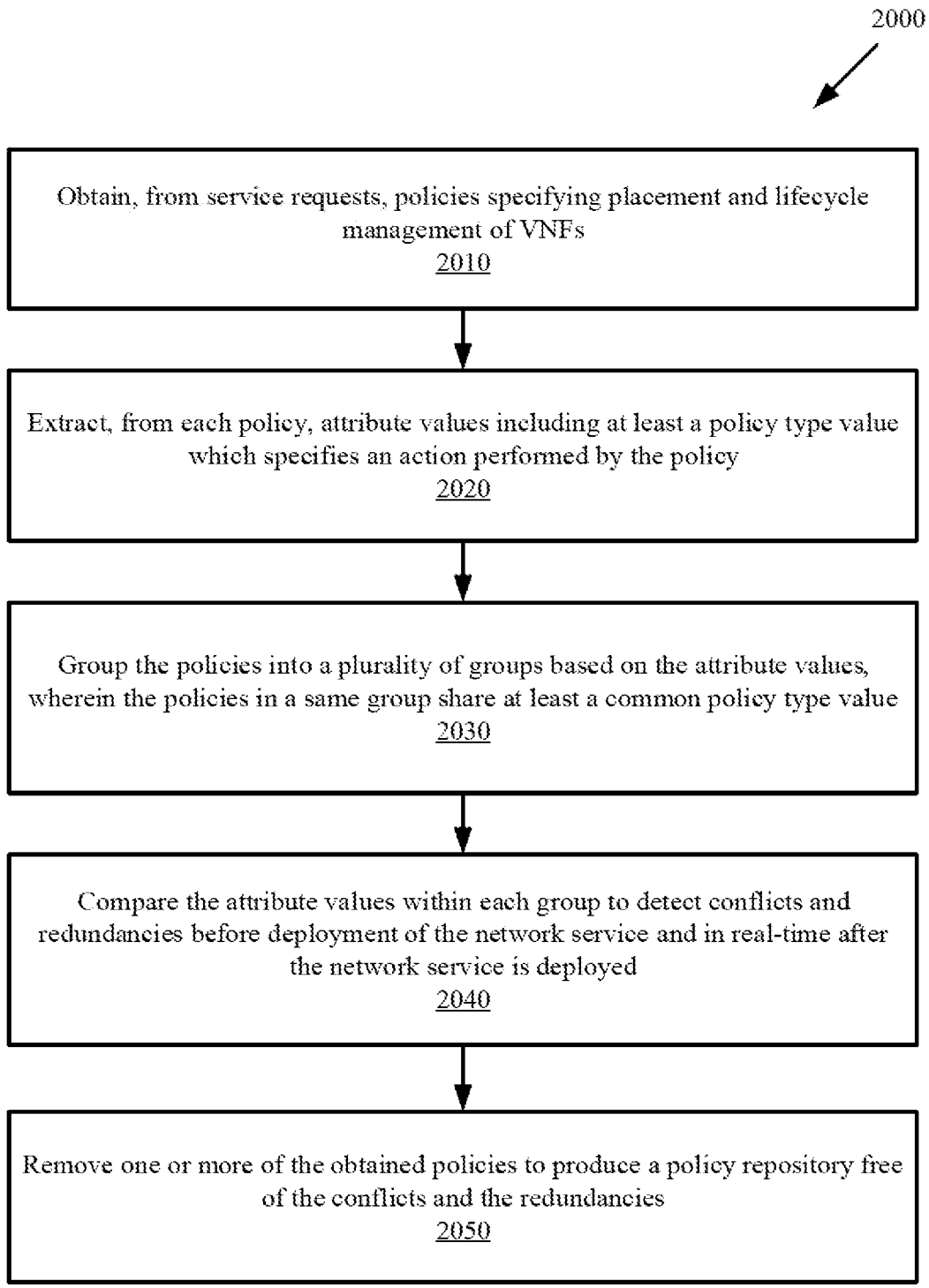
FIG. 20 is a flow diagram of a method for managing policies to provide a network service in an NFV environment according to one embodiment.

FIG. 20 is a flow diagram illustrating a method 2000 for managing policies to provide a network service in an NFV environment according to one embodiment. In one embodiment, the method 2000 may be performed by the policy manager 114 of FIG. 1 and FIG. 2. In one embodiment, the method 2000 may be performed by a computer system. In one embodiment, the method 2000 may be performed by a network node, such as network nodes 2100 and/or 2200 to be described later with reference to FIG. 21 and FIG. 22.

The method 2000 begins at step 2010 with the policy manager 114 obtaining, from service requests, policies specifying placement and lifecycle management of VNFs. From each policy, the policy manager 114 at step 2020 extracts attribute values including at least a policy type value which specifies an action performed by the policy. The action performed by the policy may include one of: placement, scaling and migration. Each policy is an affinity policy or an anti-affinity policy. Both affinity policies and anti-affinity policies are applicable to the placement and the lifecycle management of the VNFs.

The policies are grouped at step 2030 into a plurality of groups based on the attribute values, wherein the policies in the same group share at least a common policy type value. In one embodiment, the attribute values of each policy include a virtual functionality value which is a specification of one or more VNFs to which the policy applies. The policies in the same group share a common virtual functionality value in addition to the common policy type value. The virtual functionality value specifies one or more VNF nodes, one or more VNF types, or a virtual path interconnecting more than one of the VNFs. The policies in the same group share the common virtual functionality value which specifies a same number of VNF nodes or VNF types.

The policy manager 114 at step 2040 compares the attribute values within each group to detect conflicts and redundancies before deployment of the network service and in real-time after the network service is deployed. In one embodiment, when comparing the attribute values within each group, each of the known conflicts and known redundancies between two policies is encoded into a known binary string; a relation between two of the obtained policies are also encoded into a binary string; and the binary string with the known binary string are compared to detect existence of a known conflict or a known redundancy.

To resolve the detected conflicts and redundancies, the policy manager 114 at step 2050 removes one or more of the obtained policies to produce a policy repository free of the conflicts and the redundancies. In one embodiment, the attribute values may further include a priority value. When the priority value of a first policy is lower than a second policy, the first policy is removed to resolve a conflict or redundancy. The priority value includes a global priority value which indicates a priority of a policy source among a plurality of different policy sources. When the first policy and the second policy have a same global priority value, the priority value that is used for conflict and redundancy resolution is a local priority value designated by the policy source.

In one embodiment, when hen a new policy is received after deployment of the network service, one of the groups to which the new policy belongs is identified from the policy repository. In real-time during the network service, any conflict or redundancy is detected between the new policy and the identified group. The new policy is added into the policy group when no conflict or redundancy is detected between the new policy and the identified group.

Figure 21:
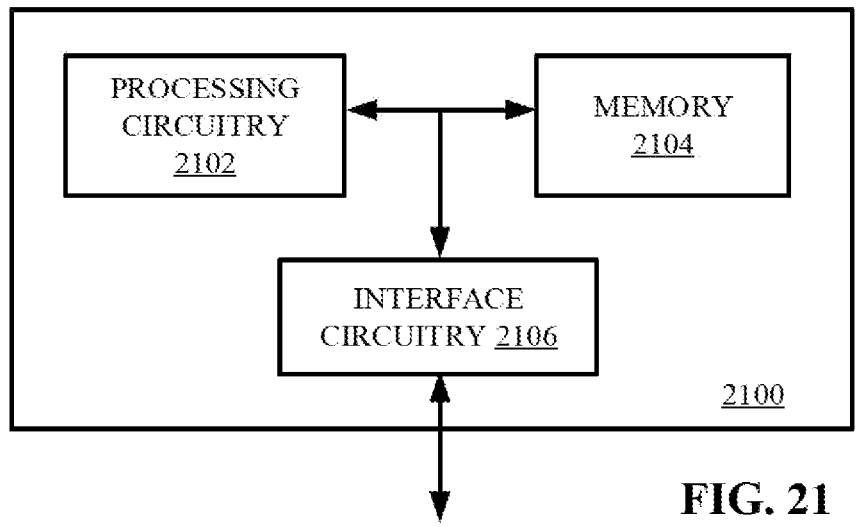
FIG. 21 is a block diagram of a network node according to one embodiment.

FIG. 21 is a block diagram illustrating a network node 2100 according to an embodiment. In one embodiment, the network node 2100 may be a server in an operator network or in a data center. The network node 2100 includes circuitry which further includes processing circuitry 2102, a memory 2104 or instruction repository and interface circuitry 2106. The interface circuitry 2106 can include at least one input port and at least one output port. The memory 2104 contains instructions executable by the processing circuitry 2102 whereby the network node 2100 is operable to perform the various embodiments described herein.

Figure 22:
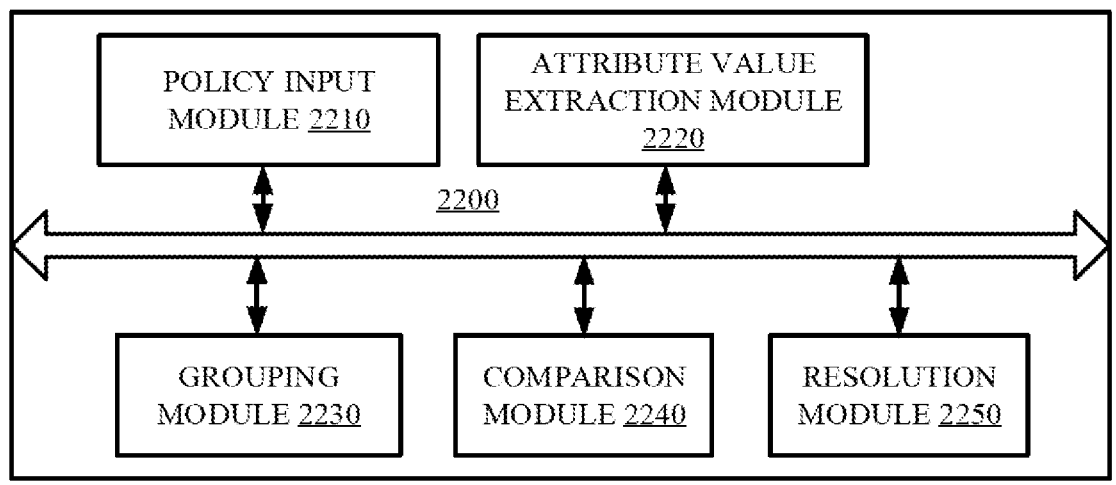
FIG. 22 is a block diagram of a network node according to another embodiment.

FIG. 22 is a block diagram of an example network node 2200 for managing policies to provide a network service in an NFV environment according to one embodiment. In one embodiment, the network node 2200 may be a server in an operator network or in a data center. The network node 2200 includes a policy input module 2210 operative or adapted to obtain, from service requests, policies specifying placement and lifecycle management of VNFs; an attribute value extraction module 2220 operative or adapted to extract, from each policy, attribute values including at least a policy type value which specifies an action performed by the policy; a grouping module 2230 operative or adapted to group the policies into a plurality of groups based on the attribute values, wherein the policies in the same group share at least a common policy type value; a comparison module 2240 operative or adapted to compare the attribute values within each group to detect conflicts and redundancies before deployment of the network service and in real-time after the network service is deployed; and a resolution module 2250 operative or adapted to remove one or more of the obtained policies to produce a policy repository free of the conflicts and the redundancies. The network node 2200 can be configured to perform the various embodiments as have been described herein.

Embodiments may be represented as a software product stored in a machine-readable medium (such as the non-transitory machine readable storage media, also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read-only memory (CD-ROM), digital versatile disc read-only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software miming from the machine-readable medium may interface with circuitry to perform the described tasks.

The above-described embodiments are intended to be examples only. Alterations, modifications and variations may be effected to the particular embodiments by those of skill in the art without departing from the scope which is defined solely by the claims appended hereto.

What is claimed is:

1. A method for managing policies to provide a network service in a Network Function Virtualization (NFV) environment, comprising:
   obtaining, from service requests, the policies specifying placement and lifecycle management of Virtual Network Functions (VNFs);
   extracting, from each policy, attribute values including at least a policy type value which specifies an action performed by the policy;
   grouping the policies into a plurality of groups based on the attribute values, wherein the policies in a same group share at least a common policy type value;
   comparing the attribute values within each group to detect conflicts and redundancies before deployment of the network service and in real-time after the network service is deployed; and
   removing one or more of the obtained policies to produce a policy repository free of the conflicts and the redundancies.

2. The method of claim 1, wherein the attribute values of each policy further include a virtual functionality value which is a specification of one or more VNFs to which the policy applies, and wherein the policies in the same group share a common virtual functionality value in addition to the common policy type value.

3. The method of claim 2, wherein the virtual functionality value specifies one or more VNF nodes, one or more VNF types, or a virtual path interconnecting more than one of the VNFs.

4. The method of claim 2, wherein the policies in the same group share the common virtual functionality value which specifies a same number of VNF nodes or VNF types.

5. The method of claim 1, wherein the attribute values further include a priority value, and wherein removing the one or more policies further comprises:
   removing a first policy that is in conflict with, or redundant of, a second policy when the priority value of the first policy is lower than the second policy.

6. The method of claim 5, wherein the priority value is a global priority value which indicates a priority of a policy source among a plurality of different policy sources.

7. The method of claim 6, wherein, when the first policy and the second policy have a same global priority value, the priority value is a local priority value designated by the policy source.

8. The method of claim 1, wherein each policy is an affinity policy or an anti-affinity policy, and wherein both affinity policies and anti-affinity policies are applicable to the placement and the lifecycle management of the VNFs.

9. The method of claim 1, wherein comparing the attribute values within each group further comprises:
   encoding each of a plurality of known conflicts and known redundancies between two policies into a known binary string;
   encoding a relation between two of the obtained policies into a binary string; and
   comparing the binary string with the known binary string to detect existence of a known conflict or a known redundancy.

10. The method of claim 1, further comprising:
    receiving a new policy after the network service is deployed;
    identifying, from the policy repository, one of the groups to which the new policy belongs;
    detecting, in real-time during the network service, any conflict or redundancy between the new policy and the identified group; and
    adding the new policy into the policy group when no conflict or redundancy is detected between the new policy and the identified group.

11. The method of claim 1, wherein the action performed by the policy includes one of:
    placement, scaling and migration.

12. A network node comprising:
    processing circuitry; and
    memory containing instructions executable by the processing circuitry for managing policies to provide a network service in a Network Function Virtualization (NFV) environment,
    the network node operative to:
      obtain, from service requests, the policies specifying placement and lifecycle management of Virtual Network Functions (VNFs);
      extract, from each policy, attribute values including at least a policy type value which specifies an action performed by the policy;
      group the policies into a plurality of groups based on the attribute values, wherein the policies in a same group share at least a common policy type value;
      compare the attribute values within each group to detect conflicts and redundancies before deployment of the network service and in real-time after the network service is deployed; and
      remove one or more of the obtained policies to produce a policy repository free of the conflicts and the redundancies.

13. The network node of claim 12, wherein the attribute values of each policy further include a virtual functionality value which is a specification of one or more VNFs to which the policy applies, and wherein the policies in the same group share a common virtual functionality value in addition to the common policy type value.

14. The network node of claim 13, wherein the virtual functionality value specifies one or more VNF nodes, one or more VNF types, or a virtual path interconnecting more than one of the VNFs.

15. The network node of claim 13, wherein the policies in the same group share the common virtual functionality value which specifies a same number of VNF nodes or VNF types.

16. The network node of claim 12, wherein the attribute values further include a priority value, and wherein the network node is further operative to:
    remove a first policy that is in conflict with, or redundant of, a second policy when the priority value of the first policy is lower than the second policy.

17. The network node of claim 16, wherein the priority value is a global priority value which indicates a priority of a policy source among a plurality of different policy sources.

18. The network node of claim 17, wherein, when the first policy and the second policy have a same global priority value, the priority value is a local priority value designated by the policy source.

19. The network node of claim 12, wherein each policy is an affinity policy or an anti-affinity policy, and wherein both affinity policies and anti-affinity policies are applicable to the placement and the lifecycle management of the VNFs.

20. The network node of claim 12, wherein the network node is further operative to:
    encode each of a plurality of known conflicts and known redundancies between two policies into a known binary string;

encode a relation between two of the obtained policies into a binary string; and compare the binary string with the known binary string to detect existence of a known conflict or a known redundancy.

21. The network node of claim 12, wherein the network node is further operative to:

receive a new policy after the network service is deployed;

identify, from the policy repository, one of the groups to which the new policy belongs;

detect, in real-time during the network service, any conflict or redundancy between the new policy and the identified group; and add the new policy into the policy group when no conflict or redundancy is detected between the new policy and the identified group.

22. The network node of claim 12, wherein the action performed by the policy includes one of: placement, scaling and migration.

* * * * *